April 21, 1970 L. JULIE 3,508,030

CONSTANT TEMPERATURE BATH FOR HIGH POWER PRECISION RESISTOR

Filed Jan. 26, 1966 2 Sheets-Sheet 1

INVENTOR
LOEBE JULIE

BY
M. J. Rackman
ATTORNEY

CONSTANT TEMPERATURE BATH FOR HIGH POWER PRECISION RESISTOR

Filed Jan. 26, 1966

INVENTOR
LOEBE JULIE
BY
M. L. Rackman
ATTORNEY

United States Patent Office 3,508,030
Patented Apr. 21, 1970

3,508,030
CONSTANT TEMPERATURE BATH FOR HIGH POWER PRECISION RESISTOR

Loebe Julie, New York, N.Y., assignor to Julie Research Laboratories, Inc., New York, N.Y., a corporation of New York Filed Jan. 26, 1966, Ser. No. 523,168
Int. Cl. H05b *1/00*
U.S. Cl. 219—209 2 Claims

ABSTRACT OF THE DISCLOSURE

A high dissipative electronic device, such as a precision resistor, is immersed in a liquid bath. The bath, of a dielectric liquid, is within an enclosure. A heater heats the bath to its boiling point. The enclosure includes a heat exchange means which, preferably, is controlled to maintain the bath temperature constant.

This invention relates to constant temperature ovens for electronic device, and more particularly to constant temperature baths for high power precision impedance elements.

In many electronic circuits it is necessary to maintain one or more impedance elements at a constant temperature. Consider the case in which a load current must be monitored. A precision resistor may be placed in series with the load, and by measuring the voltage drop across the resistor the load current may be determined. The impedance of the resistor, however, varies with temperature, and if the current is to be monitored accurately the resistor must be held at a constant temperature.

In ordinary applications, the use of a simple oven may suffice. The impedance element is included inside the oven case and a temperature-responsive control network maintains the oven temperature at the desired value. In high power applications, however, the ordinary electronic oven is incapable of holding the environmental temperature constant immediately adjacent the impedance element. A considerable quantity of heat is dissipated in the element and this heat raises the temperature of the element to so great an extent that it cannot be controlled by the use of a simple oven.

It has been suggested heretofore to minimize the temperature rise of a power precision resistor by immersing it in a liquid bath which cools the resistor by conduction and convection. In addition, the resistor is cooled by the latent heat of vaporization of the fluid if it boils. With a liquid bath large amounts of heat may be removed from the resistor with the boiling off of some of the liquid.

Unfortunately, while large amounts of heat may be removed this prior art technique of using a liquid bath has not provided the constant temperature characteristic required in precision applications. The graph for any given atmospheric pressure of the temperature of the resistor as a function of the power dissipated in the resistor usually comprises two lines of different slopes. Initially, with no current flowing through the resistor, the resistor and the bath are held at a quiescent temperature which is affected primarily by the bath environment. Once current starts to flow through the resistor and heat is dissipated in it, the temperatures of the resistor and bath rise. When parts of the bath reach the temperature of vaporization local boiling commences. The temperature versus power function is at this point typically another straight line but of lesser slope. For a given amount of input power, the temperature increment is smaller because of the fluid vaporization than it is before the boiling point is reached. Nevertheless, temperature changes may be substantial.

It is a general object of this invention to provide an improved liquid bath for a power precision resistor or similar component whose temperature must be maintained at a fixed value.

In the illustrative embodiments of the invention a pre-heating device, which may be a heating element or one which utilizes the heat supplied by the external environment, is used to bring the temperature of the bath up to vaporization temperature and to maintain it at this temperature even in the absence of current through the power resistor. Any heat subsequently dissipated in the power resistor results in additional vaporization of some of the liquid. Since the heat supplied to a liquid bath whose temperature is held at the vaporization temperature causes some of the liquid to vaporize rather than to cause the temperature of the bath to increase, by pre-heating the bath the temperature of the precision resistor is at all times maintained at the vaporization temperature of the liquid. This is true even in the absence of any current through the precision resistor. Once the resistor current starts to flow the pre-heating power may be decreased, as long as the total heat supplied to the bath is sufficient to hold it at its vaporization temperature. Prior art liquid baths have not been pre-heated in such a manner and in the absence of the dissipation of power in the element whose temperature is to be controlled, the temperature of the element and that of the bath is less than the vaporization temperature. When current begins to flow through the element and power is dissipated in it, the bath increases in temperature up to the vaporization temperature and thereafter remains approximately at this point with the additional heat dissipated in the element causing some of the liquid to vaporize. In my invention, however, with the pre-heating of the bath the element is held at the vaporization temperature even in the absence of current flow through it (or in the presence of a current flow which is insufficient to raise the temperature of the bath to the boiling point).

As described above, for a given pressure on the bath the temperature versus power characteristic is typically comprised of two lines of different slopes. The first line extends between temperature values which are the quiescent and vaporization temperatures of the liquid. The pre-heating of the fluid insures that this variation is eliminated: even in the absence of current flow through the resistor, the resistor is held at the vaporization temperature and thus with the initiation of current flow there is no immediate substantial rise in temperature. But even after boiling commences, the temperature of the bath and resistor rises above the preselected vaporization temperature. I have discovered that the cause for this additional rise is due to the building up of gas pressure inside the enclosure containing the bath. The pressure inside the case which includes the bath varies in accordance with the amount of the liquid already vaporized and not yet condensed. It is well-known that the vaporization temperature of any liquid varies in accordance with the atmospheric pressure around it. Consequently, as the gas pressure in the case varies in accordance with the amount of the liquid which is vaporized, the vaporization temperature of the liquid changes. Since the resistor is held at the vaporization temperature, the temperature of the element rises as the vaporization process continues.

In the illustrative embodiments of the invention this problem is overcome with the use of a pressure sensor whose output is a function of the gas pressure in the case. In a first embodiment of the invention, the pressure sensor output controls the pre-heating element. If the pressure inside the case increases above the desired value, thereby increasing the vaporization temperature of the liquid, the heat supplied by the pre-heater is decreased. The rate of vaporization decreases, the pressure is lowered, and the vaporization temperature of the liquid solution is brought back down to the desired value. Conversely, if the gas pressure decreases, a greater amount of pre-heating takes place to bring the pressure back up to the desired value.

In a second embodiment of the invention, the amount of heat supplied by the pre-heater is constant and the pressure sensor output controls the rate of heat exchange between the vapor inside the case and the case surroundings, e.g., the atmosphere. If the gas pressure increases above the desired value, the pressure sensor causes a greater amount of heat to flow from the case interior to the atmosphere and the gas pressure is brought back down to the desired value. Conversely, if the gas pressure drops below the desired value, the rate of heat exchange is lowered and the gas pressure builds up. In either case, the pressure sensor output controlling the rate of heat exchange causes the pressure of the gas inside the case to be maintained at a predetermined value. As in the first embodiment where the pressure sensor controls the operation of the pre-heater, the gas pressure inside the case is held constant and the boiling point of the liquid is similarly fixed, thereby causing the temperature of the precision resistor or other high dissipative impedance element to be maintained at a predetermined value.

The pressure sensor output may control either the pre-heating or the rate of heat exchange as described above. In either case, the gas pressure of the vaporized liquid is held at that value which provides the preselected vaporization temperature. In the equilibrium state the system operation may be summarized as follows. The sum of the power supplied by the pre-heater and the power dissipated in the resistor equals the rate of heat exchange provided by the heat exchanger. In this equilibrium condition the net power supplied to the system is zero, and consequently the temperature of the bath remains constant. This equilibrium condition is achieved automatically by controlling either the rate of heat exchange or the degree of pre-heating as described above.

A most advantageous operation may be obtained if changes in the power delivered by the pre-heater to the bath are equal and opposite to changes in the power dissipated in the precision resistor whose temperature is to be controlled. That is, once a quiescent condition is established, if the power dissipated in the power resistor increases, the power delivered by the pre-heater to the bath should decrease by the same amount, and vice versa. In a typical application, the current through the load and the precision resistor is delivered by a power amplifier. As in the case of most amplifiers, a considerable amount of power is dissipated in the amplifier itself, which power is wasted. In one of the illustrative embodiments of my invention the power amplifier itself is used as the pre-heater. With such an arrangement a separate pre-heater is not required—the heat dissipated in the system power source is used to advantage. Since in this embodiment of the invention the heating of the liquid bath is controlled by the system power source, which control is a function of system requirements and not various bath conditions, the heat delivered to the bath cannot be controlled by the pressure sensor. In this embodiment, therefore, the pressure sensor is used to control the rate of heat exchange between the vapor in the case and the atmosphere.

In the three embodiments thus far described the precision resistor is immersed in the center of the liquid bath. These systems have been found to limit temperature variations of the resistor to within 1° C., as compared with variations of more than 100° C. if the resistors are not immersed in a bath and are exposed to the room environment. It is difficult to reduce the temperature variations below 1° C. because of super-heating effects. The precision resistor may dissipate so much power that the liquid immediately around it actually rises in temperature above the vaporization temperature of the remainder of the bath. To overcome this problem in the fourth and fifth embodiments of the invention, the precision resistor is immersed in the bath by being held in place directly above it. The bath is held at the desired temperature and the liquid is sprayed or splattered on the resistor. In the fourth embodiment of the invention, a pump is used to spray the resistor. In the fifth embodiment, the resistor is placed so close to the surface of the liquid that the gas bubbles which rise up from the liquid splatter some of it on the resistor. In both cases, the resistor is held fixed above the bath at an angle so that the liquid droplets flow back into the bath. Because at all times there is only a thin film of the liquid around the resistor, the super-heating effect does not take place. The use of a spraying or splattering technique allows variations in the temperature of the precision resistor to be held within 0.1° C.

It is a feature of this invention to immerse a high power precision resistor whose temperature is to be controlled in a liquid bath and to pre-heat the bath to maintain its temperature at the vaporization temperature for a predetermined atmospheric pressure.

It is another feature of this invention to provide a heat exchanger for extracting the heat in the gaseous atmosphere surrounding the bath and for delivering it to the external surroundings.

It is another feature of this invention, in one embodiment thereof, to control the pre-heating of the liquid bath in accordance with the pressure of the gaseous atmosphere.

It is another feature of this invention, in a second embodiment thereof, to control the rate of heat exchange through the heat exchanger in accordance with the pressure of the gaseous atmosphere.

It is another feature of this invention, in a third embodiment thereof, to pre-heat the liquid bath by using the heat dissipated in the power amplifier which delivers current to the precision resistor.

It is still another feature of this invention, in fourth and fifth embodiments thereof, to immerse the precision resistor in the liquid bath not by placing it directly in the bath, but by placing it above the bath and spraying it with the liquid or allowing it to be splattered by the bubbles rising out of the bath.

Further objects, features and advantages of the invention will become apparent upon consideration of the following detailed description in conjunction with the drawing, in which.

Figure 1:
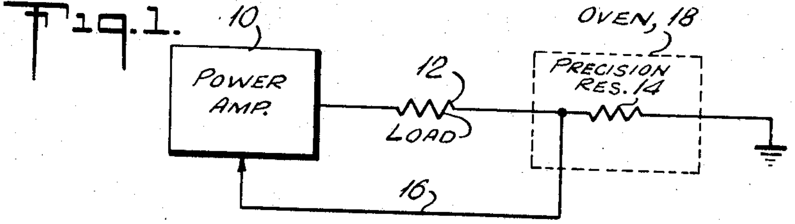
FIG. 1 is a schematic illustration of a system in which it is necessary to insure that the temperature of a precision resistor is held fixed at a predetermined value.

FIG. 1 illustrates an application in which it may be necessary to maintain constant the temperature of a precision resistor. Load 12 may, for example, be a large coil for establishing a strong magnetic field which requires a current of 20 amperes. The magnitude of the current must be accurately controlled. A precision resistor 14 is placed in series with the load and if the magnitude of its impedance is held constant, the voltage across it provides an accurate indication of the current through the load. For example, suppose the magnitude of resistor 14 is 0.2 ohm. With 20 amperes flowing through the resistor four volts appear across it. Feedback path 16 is used to control the current delivered by power amplifier 10 to load 12 and the power resistor. If the voltage across the resistor drops below four volts, the power amplifier delivers a greater current to the load. If the voltage across the resistor increases above four volts, the current delivered is reduced. This type of control is effective only if the impedance of the precision resistor is held fixed at 0.2 ohm. With a current of 20 amperes flowing through the resistor, the power dissipated in it is $(20)^2(0.2)$ or 80 watts. This is a relatively large amount of power and would ordinarily cause the temperature of the resistor to rise with a resulting change in impedance. For this reason, the precision resistor is included in an oven 18. The oven functions to cool the resistor and to maintain its temperature constant. Ordinary electronic ovens, however, are insufficient for this purpose because of the great amont of heat dissipated in the resistor.

Figure 2:
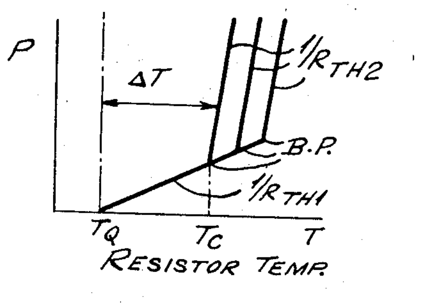
FIG. 2 is a graph illustrating the power dissipated per unit area of a sheet resistor as a function of the temperature of the resistor when it is immersed in a liquid with a well-defined boiling point.

It has been suggested in the prior art to immerse the precision resistor in a liquid bath, such as Freon manufactured by the Du Pont Company. In such a case, the power dissipated per unit area of the resistor (assuming, for example, that it is a sheet resistor) as a function of temperature takes the form shown in FIG. 2. In general, the rise in temperature of a resistor is expressed by the equation: $\Delta T = P \times R_{TH}$, where $\Delta T$ is the change in temperature of the resistor from the ambient temperature when the magnitude of power dissipated in the resistor is P. $R_{TH}$, the thermal resistance, is a measurable quantity and is a function of the resistor characteristics and the environment. When the resistor is immersed in a high dielectric liquid, such as Freon, the power versus temperature characteristic exhibits two well-defined slopes. The point where the slope changes depends upon the atmospheric pressure on the liquid as seen in FIG. 2. With no power dissipated in the resistor, the quiescent temperature of the resistor, $T_Q$, is that of the liquid. As current through the resistor increases and the power dssipated increases, the temperature goes up. The slope of the characteristic is $1/R_{TH1}$. The temperature rise is continuous until the temperature of the liquid reaches the value $T_C$, the boiling point. At this time, the slope of the characteristic changes to $1/R_{TH2}$. $R_{TH2}$ is much smaller than $R_{TH1}$ and represents the ability of the boiling liquid to remove heat efficiently by absorbing the heat of vaporization, gas bubbles breaking away from the resistor surface so that the process of gas formation can continue rapidly with fresh liquid. The lowermost curve in FIG. 2 represents heat taken away from the resistor by conduction, convection and radiation. The upper curves of much greater slope results from the additional heat taken away by changing some of the liquid bath to its gaseous state.

The quantity $\Delta T$ in FIG. 2 represents the change from the quiescent temperature of the resistor as the power dissipated in the resistor increases. In the prior art, precision resistors have been immersed in liquid baths and although once the critical temperature of vaporization is reached further changes in the temperature are minimized until this temperature is reached there may be a considerable rise above the ambient temperature. As described above, in accordance with an aspect of my invention the liquid bath is preheated so that even in the absence of current flow through the resistor the temperature of the bath is held at $T_C$. This minimum temperature is always maintained. As current starts to flow through the precision resistor the resistor temperature may increase slightly, as evidenced by the line of slope $1/R_{TH2}$. But because of the pre-heating, the initial temperature of the bath is $T_C$ and the major contributing factor to $\Delta T$ is eliminated.

Figure 3:
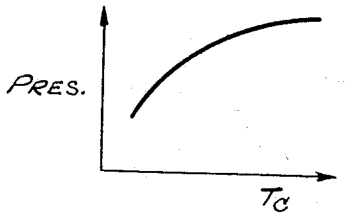
FIG. 3 is a graph illustrating the variation of the temperature of vaporization of a liquid as a function of the atmospheric pressure surrounding it.

While this pre-heating is advantageous, it does not overcome one of the basic problems encountered with the use of liquid baths. As described above with reference to the multiple curves in FIG. 2 of slope $1/R_{TH2}$, and as shown more clearly in FIG. 3, the temperature of vaporization of a liquid varies in accordance with the atmospheric pressure, the temperature generally increasing with pressure. If the liquid bath is included in any kind of enclosure, the pressure will build up as more and more liquid boils off. As the pressure builds up, the value of $T_C$ increases and consequently $\Delta T$ in FIG. 2 increases as well. Even in an open boiling system (which is impractical for most applications) minor changes in the atmospheric pressure will produce large changes in the temperature of vaporization. While the change in the temperature is not as great as that resulting when the pre-heater and the resistor are placed in a closed vessel, the change may be great enough to preclude accurate control of the current delivered to the load and the resistor.

Figure 4:
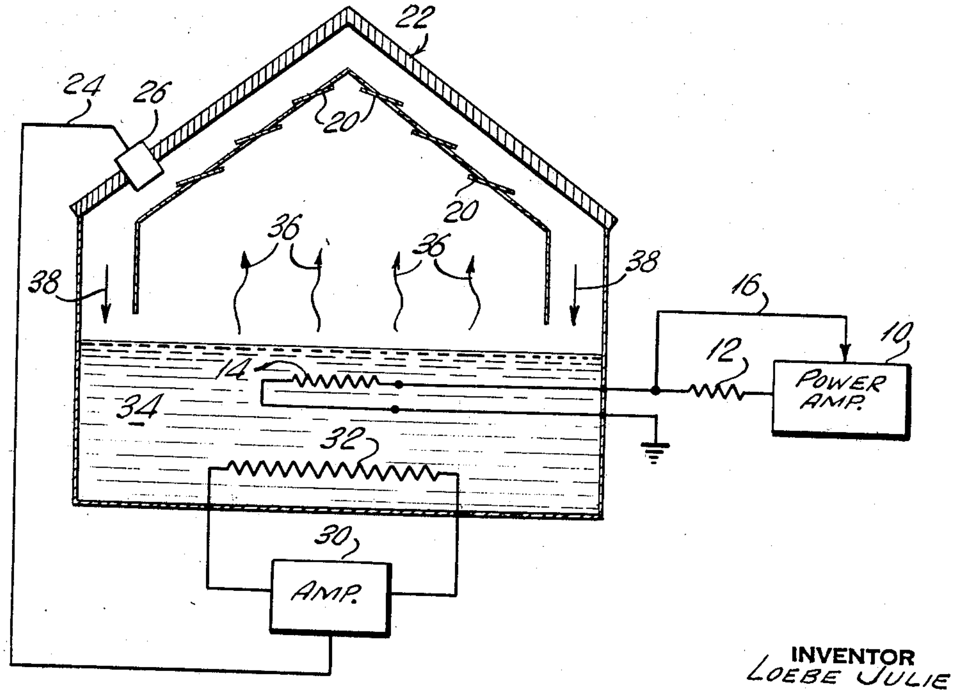
FIG. 4 is a first illustrative embodiment of the invention.

This problem is overcome in the embodiment of FIG. 4. An oven case 18 is provided, the case containing the liquid bath 34. The precision resistor 14 is immersed in the bath and its two leads are extended outside the case to load 12 and power amplifier 10. A pre-heater coil 32 is also immersed in the bath and current is supplied to this coil from amplifier 30. The pre-heater insures that the liquid is held at the boiling point even in the absence of power dissipation in the precision resistor. It is this basic technique of initially raising the bath to the temperature of vaporization that greatly minimizes the $\Delta T$ variation in FIG. 2 because the temperature characteristic of the precision resistor is defined solely by the line of slope $1/R_{TH2}$, and all temperature deviations are measured from $T_C$ rather than $T_Q$.

In the embodiment of FIG. 4, as some of the liquid turns to gas as a result of the heating of the bath, this process being shown by arrows 36, the gas rises through baffles 20 and comes into contact with heat exchanger 22. The heat exchanger extracts heat from the rising gas and delivers it to the external atmosphere. With heat removed from the gas it changes back to liquid form and drops down along the baffles 20 to the side regions of the bath, as shown by arrows 38. The recently formed liquid is preferably not returned to the center of the bath where the precision resistor is located. The newly formed liquid may be at a temperature lower than that of the vaporization temperature. For this reason, the baffles cause the newly formed liquid to return to the bath at regions far removed from the precision resistor, which regions may be thought of as fluid mixing or pre-heating regions, as contrasted with the main region at the center of the bath. By the time the returning liquid reaches the precision resistor, its temperature is raised to the boiling point.

As more and more gas is formed, the pressure inside the oven will tend to increase. In accordance with an aspect of my invention this pressure is held at the level which provides the desired temperature of vaporization for which the system is designed. For this reason, pressure sensor 26 is used to measure the pressure inside the case. The pressure sensor is a transducer which converts an input pressure to an output electrical signal on conductor 24. This signal controls the magnitude of the current delivered by amplifier 30 to the heating coil. If the pressure rises above the designed value, amplifier 30 is controlled to deliver less current to the heating coil, thereby causing less liquid to boil off to reduce the pressure to the desired value. Similarly, if the pressure falls below the desired value, e.g., current through the precision resistor suddenly decreases, amplifier 30 is controlled to deliver more current to the heating coil. The system is basically a closed loop. What is desired is a constant liquid bath temperature. There is one and only one value of gas pressure which will provide this desired temperature value. By controlling the pressure in the tank and insuring that it remains constant, the temperature of the bath is maintained at the desired value.

The pressure sensor may be of the on-off type, or in a more refined system a continuous or linear device. If an on-off type of device is used, amplifier 30 might be designed to deliver only two different currents. If the pressure increases above the desired value, the pressure sensor is turned on and causes amplifier 30 to supply the smaller current to the heating coil. If the pressure drops below the desired value, the pressure sensor is turned off and the amplifier delivers the larger current to the heating coil. A problem which may be encountered with the use of this type of pressure sensor is the usual one encountered when discontinuous devices are used in servomechanism systems. The pressure may continuously oscillate around the designed value, in which case the magnitude of the amplifier current is continuously changed. A continuous type of pressure sensor is therefore more desirable. In such a case, the amplifier can deliver a continuously variable current to the heating coil. The electrical output of the pressure sensor is proportional to the pressure and the current delivered by the amplifier is inversely proportional to the electrical signal on conductor 24. In such a case, the greater the deviation in pressure, the greater the deviation in preheating current in the opposite direction. With such a design, the discontinuous operation does not take place. There are many proportional-control pressure sensors which may be used for this purpose. Typical of these is that employing a carbon disc in which the resistance of the disc is changed as the gas pressure varies.

In the steady state, with the temperature of the liquid bath held constant, the equation which describes the system operation is the following:

$$P_{PH}+P_R-P_{HE}=0$$

where $P_{PH}$ is the power delivered by the pre-heater to the bath, $P_R$ is the power delivered by the precision resistor to the bath, and $P_{HE}$ is the rate at which heat energy is removed from the gas and delivered to the external atmosphere. If this equation holds true the bath temperature does not vary. In the embodiment of FIG. 4, the quantity $P_{PH}$ is controlled by the pressure sensor to insure that the sum of the heat delivered by the preheater and the precision resistor is equal to the heat exchanged between the gas and the external atmosphere.

Figure 5:
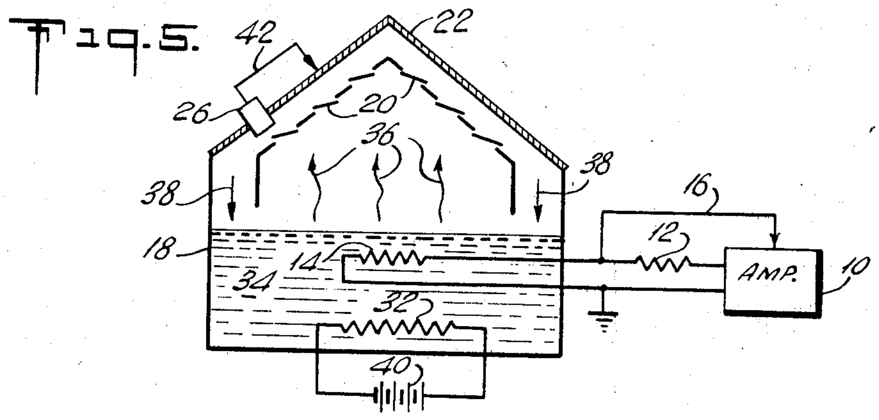
FIG. 5 is a second illustrative embodiment of the invention.

The steady state condition may be controlled not only by varying the preheater-power, but also by varying the rate of the heat exchange. In the embodiment of FIG. 5, the current for heating coil 32 is supplied by a battery 40, i.e., the pre-heater power is constant. The output of the pressure sensor appearing on conductor 42 controls the rate of heat exchange. Typically, this may be achieved by a throttling action, the rate of flow of coolant through the heat exchanger varying in accordance with the pressure sensor output signal on conductor 42. If the pressure rises above the desired value, more coolant is pumped through the heat exchanger to convert the gas back to its liquid form at a greater rate, thereby bringing the pressure back down to the designed value. Conversely, if the pressure is too low, less coolant flows through the heat exchanger to cause the pressure to build up. Again, by maintaining the pressure at a constant value, the temperature of the liquid bath is held fixed.

Other embodiments are possible which incorporate the design features of both FIGS. 4 and 5. It is possible, for example, to provide a controllable heat exchanger as well as a controllable pre-heater in which case the pressure sensor output controls both the pre-heating power and the rate of heat exchange. Furthermore, the sensing element need not be a pressure sensor. A thermometer or other temperature measuring device may be included in the bath adjacent the precision resistor. This temperature transducer may in turn control the rate of operation of either the heat exchanger or the pre-heater, or both.

Still other variations are possible. For example, instead of providing a pre-heater, if the temperature of the surrounding atmosphere is always greater than the desired temperature of vaporization, the system may be designed such that the liquid bath is pre-heated by the surrounding atmosphere, the liquid container in this case being a good conductor of heat. The sensing device would in this case control the operation of the heat exchanger to close the feed back loop.

Figure 6:
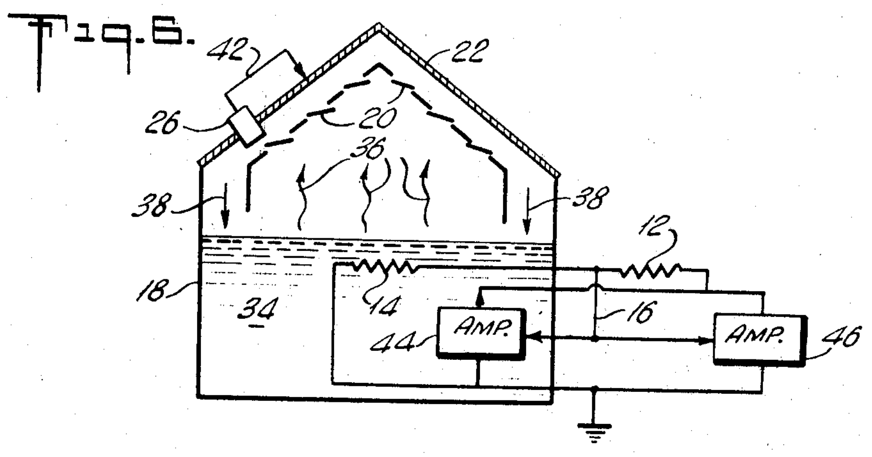
FIG. 6 is a third illustrative embodiment of the invention.

The embodiment of FIG. 6 is a refinement of that of FIG. 5 and shows an alternative pre-heater source. (The system may additionally include the heating coils of FIGS. 4 and 5 if necessary.) It must be recalled that the oven is designed for use in a system which delivers a large current to a load. The power amplifier 10 which delivers this current, because it is almost never 100% efficient, dissipates a considerable quantity of heat. This heat may be used to advantage to pre-heat the liquid bath. In FIG. 6, the power amplifier comprises two separate amplifiers 44 and 46, one of which is included inside the bath. The two amplifiers are connected in parallel for delivering current to load 12 and resistor 14. The voltage on conductor 16 controls the current delivered by both amplifiers to insure that a constant current flows through the load. The amplifiers are designed such that no matter how much current is delivered by them, the ratio of the power ratings of the two amplifiers is always constant.

Amplifiers 44 and 46 are designed such that the total power dissipated by them and the total power delivered by them to the load is constant, e.g., 1100 watts. Suppose that the impedance of resistor 12 is ten times that of resistor 14. Amplifier 46 is designed to dissipate ten times the power dissipated by amplifier 44. With no load current delivered, amplifier 46 dissipated 1000 watts, amplifier 44 dissipates 100 watts, and this 100 watts of power is delivered to the bath. Consider what happens if the amplifiers are suddenly controlled to deliver 800 watts to the load resistor. Since the impedance ratio is 10:1, 80 watts are delivered to the precision resistor. With 880 watts thus accounted for, 220 watts remain to be dissipated by the two amplifiers, still in the ratio 10:1. Thus amplifier 44 dissipates 20 watts and the total power delivered to the bath is still 100 watts, the 80 watts dissipated in the precision resistor and the 20 watts dissipated in amplifier 44. The liquid bath thus serves the double function of precision resistor bath and amplifier heat sink.

The arrangement of FIG. 6 is particularly advantageous because the sum of the power delivered to the load and the power dissipated in each of amplifiers 44 and 46 is always constant, i.e., if the power delivered increases the power dissipation decreases, and vice versa. The basic system steady state equation, as described above, is $P_{PH}+P_R-P_{HE}=0$. It is desirable that the heat exchanger operate at a constant rate. The smaller the number of variables in the system, the smaller the number of problems which may be encountered. If the rate of heat exchange is held constant, the basic system equation may be written as follows: $\Delta P_{PH}=-\Delta P_R$, i.e., any change in preheater power must be equal and opposite to the change in the power dissipation in the precision resistor. In the system of FIG. 6, recalling that if the power delivered by amplifier 44 increases the power dissipated in it decreases, and vice versa, it can be shown that the inclusion of amplifier 44 in the bath actually provides, by itself, the steady state condition, even though the pressure sensor does not control the amplifier operation. (The pressure sensor cannot exert an influence on the amplifiers since the current delivered by them is determined by system requirements.) Thus the condition $\Delta P_{PH}=-\Delta P_R$ is fulfilled automatically and there may be no need for a pressure sensor to control the rate of heat exchange. Of course, it is preferable that the pressure sensor be included in the system to prevent runaway conditions.

Figure 7:
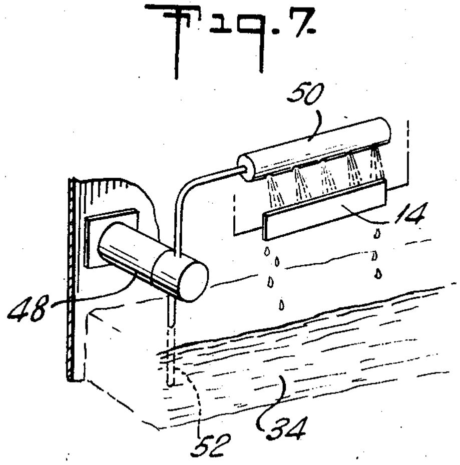
FIG. 7 illustrates a fourth illustrative embodiment of the invention, and shows an arrangement which may be used with any of the embodiments of FIGS. 4–6.
Figure 8:
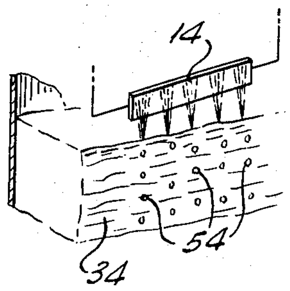
FIG. 8 illustrates a fifth illustrative embodiment of the invention, and shows an arrangement which may be used with any of the embodiments of FIGS. 4–6.

Other variations in the basic embodiments shown in the drawings are possible. "Local" heaters may be used, for example, at the extremities of the bath to heat the returning liquid (arrows 38) up to the temperature of vaporization. In FIG. 6 amplifier 44 may supply current to only the precision resistor and amplifier 46 may supply current to only the load, provided that the operating ratio 10:1 is maintained. Similarly, many precision resistors or other devices may be included in a single bath. Two variations which are particularly advantageous are shown in FIGS. 7 and 8. Without the immersion of the precision resistor in a liquid bath and a control mechanism to maintain the pressure in the tank constant, the temperature of the resistor may vary from the ambient temperature to a great extent, e.g., more than 100° C. With the pre-heated liquid bath and the pressure control, the range of temperature variation may be reduced to 1° C. It may be desirable to reduce the temperature variation still further. Unfortunately, this is exceedingly difficult if the precision resistor is immersed directly in the bath. A super-heating effect takes place and the temperature of the liquid immediately surrounding the resistor actually rises slightly above the boiling point. That is, while the over-all bath temperature may be held fixed, the temperature of the liquid directly surrounding the resistor may be slightly higher. This super-heating takes place because the heat dissipated in the resistor may not be transmitted through the surrounding liquid layer to the rest of the bath fast enough and may not all be consumed in changing the liquid layer around the resistor to its gaseous form. This problem may be obviated by placing the resistor, which may be a sheet resistor, slightly above the bath surface. While the resistor is still "immersed" in the bath, the layer of film surrounding the resistor is relatively thin. The resistor is "immersed" in the bath by spraying or splattering it with the liquid. In the embodiment of FIG. 7, a pump 48 is used for this purpose. The pump draws some of the liquid through tube 52 and delivers it to manifold 50 which in turn sprays the liquid on precision resistor 14. In the embodiment of FIG. 8, the resistor is held immediately above the liquid surface so that the gas bubbles 54 which rise out of the liquid splatter around the resistor. In both cases, the resistor is at an angle so that droplets of the liquid on the resistor will flow down and fall back into the main bath. This insures that a thick film does not form on the resistor to contribute to the super-heating effect.

It is to be understood that the above described embodiments are merely illustrative of the application of the principles of the invention. Numerous modifications may be made therein and other arrangements may be devised without departing from the spirit and scope of the invention.

What is claimed is:

1. A constant temperature oven for a high dissipative electronic device comprising an enclosure, a high dielectric liquid contained in said enclosure, said high dissipative electronic device being immersed in said liquid, means for heating said liquid to its boiling point, heat exchanger means for extracting heat from gas contained in said enclosure and transmitting it to the atmosphere surrounding said enclosure, sensing means for controlling the operation of said oven such that the sum of the power dissipated in said electronic device and the power supplied to said liquid by said heating means is equal to the heat extracted by said heat exchanger means, wherein said sensing means controls the operation of said heat exchanger means.

2. A constant temperature oven for a high dissipative electronic device comprising an enclosure, a high dielectric liquid contained in said enclosure, said high dissipative electronic device being immersed in said liquid, means for heating said liquid to its boiling point, heat exchanger means for extracting heat from gas contained in said enclosure and transmitting it to the atmosphere surrounding said enclosure, sensing means for controlling the operation of said oven such that the sum of the power dissipated in said electronic device and the power supplied to said liquid by said heating means is equal to the heat extracted by said heat exchanger means, wherein said sensing means is responsive to the pressure of the gas in said enclosure and in accordance with said pressure controls the operation of said heat exchanger means.

References Cited

UNITED STATES PATENTS

| | | | |
|---|---|---|---|
| 1,183,925 | 5/1916 | Waters | 219—494 X |
| 1,874,909 | 8/1932 | Conklin | 236—99 |
| 1,999,473 | 4/1935 | Osnos | 236—1 |
| 2,054,658 | 9/1936 | Osnos | 236—1 |
| 2,179,838 | 11/1939 | Young | 310—8.9 |
| 2,643,282 | 6/1953 | Greene | 174—15 |
| 2,524,886 | 10/1950 | Colander et al. | 219—210 |
| 2,762,895 | 9/1956 | Throw | 219—496 |
| 2,942,783 | 6/1960 | Dyer et al. | 219—209 X |

FOREIGN PATENTS

| | | | |
|---|---|---|---|
| 873,122 | 7/1961 | Great Britain. | |

JOSEPH V. TRUHE, Primary Examiner

C. L. ALBRITTON, Assistant Examiner

U.S. Cl. X.R.

219—209, 326, 332, 381, 494, 496, 510; 236—1